US012668512B2

(12) United States Patent
Chan et al.

(10) Patent No.: US 12,668,512 B2
(45) Date of Patent: Jun. 30, 2026

(54) TREATMENT METHOD FOR INDIGO-CONTAINING WASTEWATER BY COMBINED ADSORPTION AND REGENERATION PROCESS

(71) Applicant: The Hong Kong Research Institute of Textiles and Apparel Limited, Kowloon (HK)

(72) Inventors: Alex Chan, Kowloon (HK); Ray Chun Wai Cheung, Kowloon (HK); Lik Ki Mui, Kowloon (HK); Hau To Wong, Kowloon (HK)

(73) Assignee: The Hong Kong Research Institute of Textiles and Apparel Limited, Kowloon (HK)

( * ) Notice: Subject to any disclaimer, the term of this patent is extended or adjusted under 35 U.S.C. 154(b) by 330 days.

(21) Appl. No.: 18/457,123

(22) Filed: Aug. 28, 2023

(65) Prior Publication Data

US 2025/0074791 A1     Mar. 6, 2025

(51) Int. Cl.
C02F 1/28 (2023.01)
B01J 20/02 (2006.01)
(Continued)

(52) U.S. Cl.
CPC ........... C02F 1/281 (2013.01); B01J 20/0229 (2013.01); B01J 20/08 (2013.01); B01J 20/3475 (2013.01);
(Continued)

(58) Field of Classification Search
None
See application file for complete search history.

(56) References Cited

U.S. PATENT DOCUMENTS 1,836,301 A     12/1931 Bechthold
2,387,936 A     10/1945 Nicholls et al.
(Continued)

FOREIGN PATENT DOCUMENTS

CN     101376747 B     7/2011
CN     102659235 A     9/2012
(Continued)

OTHER PUBLICATIONS https://borgenproject.org/indigo-dye-is-affecting-the-water-supply-in-india/ (Year: 2019).*
(Continued)

*Primary Examiner* — Benjamin L Lebron
*Assistant Examiner* — Bernadette Karen Mcgann
(74) *Attorney, Agent, or Firm* — Stein IP, LLC

(57) ABSTRACT

An integrative approach combines a process of adsorption and ozonation which are used for removing the indigo dye from textile wastewater and the regeneration of adsorbent materials. Metal oxide modified adsorbents are efficient dye adsorbent materials for indigo dye wastewater and are used have been developed for adsorption process and regenerated by ozonation process. Upon the regeneration process, the adsorption capacity has been recovered. The synergistic effect of adsorption and ozonation benefit for the efficient dye removal from wastewater and the adsorbent regeneration achieved in an environmentally friendly and cost effective way.

5 Claims, 6 Drawing Sheets

(51) Int. Cl.
    B01J 20/08         (2006.01)
    B01J 20/34         (2006.01)
    C02F 101/30       (2006.01)
    C02F 103/34       (2006.01)

(52) U.S. Cl.
    CPC .... *C02F 2101/308* (2013.01); *C02F 2103/34*
                              (2013.01)

(56)             References Cited

U.S. PATENT DOCUMENTS

| | | | |
|---|---|---|---|
| 4,124,528 A | 11/1978 | Modell | 252/411 R |
| 4,165,288 A | 8/1979 | Teed et al. | 210/23 H |
| 4,686,198 A | 8/1987 | Bush et al. | 502/25 |
| 4,835,338 A | 5/1989 | Liu | 585/823 |
| 4,880,510 A | 11/1989 | Uhrich | 204/131 |
| 5,182,030 A | 1/1993 | Crittenden et al. | 210/748 |
| 5,187,131 A | 2/1993 | Tiggelbeck et al. | 502/34 |
| 5,457,043 A | 10/1995 | Mark et al. | 435/195 |
| 5,904,832 A | 5/1999 | Clifford et al. | 205/756 |
| 5,998,324 A | 12/1999 | Salvador Palacios et al. | 502/22 |
| 8,187,991 B2 | 5/2012 | Osaheni et al. | 502/31 |
| 2008/0314764 A1 | 12/2008 | Schrott et al. | 205/759 |
| 2009/0261042 A1* | 10/2009 | Semiat | B01J 20/3433 |
| | | | 977/773 |
| 2011/0017098 A1 | 1/2011 | Wambuguh et al. | 106/484 |
| 2011/0241230 A1* | 10/2011 | Kerfoot | B01D 24/10 |
| | | | 261/37 |
| 2018/0222773 A1 | 8/2018 | Essandoh et al. | |
| 2019/0234011 A1 | 8/2019 | Allen et al. | |

FOREIGN PATENT DOCUMENTS

| | | | | |
|---|---|---|---|---|
| CN | 103157435 A | | 6/2013 | |
| CN | 103611492 A | * | 3/2014 | |
| CN | 105749875 A | | 7/2016 | |
| CN | 104854034 B | | 3/2018 | |
| CN | 108607499 A | | 10/2018 | |
| CN | 208898683 U | | 5/2019 | |
| CN | 114682212 A | * | 7/2022 | ............. C02F 1/722 |
| CN | 114684952 A | | 7/2022 | |
| ES | 2599104 B1 | | 10/2017 | |
| JP | 2007-203147 A | | 8/2007 | |
| JP | 2013-215682 A | | 10/2013 | |
| TW | 201124198 A | | 7/2011 | |
| TW | I617515 B | | 3/2018 | |
| WO | WO 1994/018312 A1 | | 8/1994 | |
| WO | WO 2009/099395 A1 | | 8/2009 | |
| WO | WO 2017/001712 A1 | | 1/2017 | |
| WO | WO 2017/066000 A1 | | 4/2017 | |

OTHER PUBLICATIONS

Machine generated translation of CN 114682212 A (Year: 2022).*
Machine generated translation of CN 103611492 A (Year: 2014).*
International Search Report mailed May 13, 2024, issued to corresponding International Application No. PCT/IB2023/058860.
Written Opinion of the International Searching Authority mailed May 13, 2024, issued to corresponding International Application No. PCT/IB2023/058860.

* cited by examiner

|  | Surface area ($m^2$/g) | Pore volume ($cm^3$/g) |
|---|---|---|
| $Al_2O_3$ | 213.431 | 1.777 |
| $Fe/Al_2O_3$ | 229.147 | 0.607 |

TREATMENT METHOD FOR INDIGO-CONTAINING WASTEWATER BY COMBINED ADSORPTION AND REGENERATION PROCESS

BACKGROUND OF THE INVENTION

1. Field of the Invention

Aspects of the present invention involve an integrative approach for processing waste containing indigo dye using processes of adsorption and regeneration to remove the indigo dye from textile wastewater and restoring the adsorption capacity of adsorbent materials. Ozone is generated externally by applying an electrical charge to the air passing through. Micro-nano-bubbles (MNBs) from a micro-nanobubbler are used in this system to prolong the retention of ozone in an aqueous phase, for example, indigo-containing wastewater.

2. Description of the Related Art

Indigo dye is extensively used by the textile industry, specifically in the blue jeans industry. While about 80% of the indigo dye may be fixed onto a cotton fabric, particularly denim fabric, between 5 and 20% remains in and effluent stream and should be removed and purged from the effluent stream. Typical dye house effluent concentrations, in a typical wastewater treatment, involve primary (for example, screening/sedimentation), secondary (for example, aerobic or anaerobic digestion, coagulation, flocculation) and followed by tertiary treatment processes (for example, adsorption, reverse osmosis, ultrafiltration). The wastewater is treated using physicochemical and biological methods in the primary and secondary treatment process. However, these methods are not effective in indigo degradation, as the indigo dye has a high molecular weight and low biodegradability, and it is toxic for the microorganisms used in the secondary treatment process. So alternative tertiary treatment processes are commonly used for the indigo dye wastewater treatment, such as a Fenton reaction by way of example. However, the Fenton reaction consumes a huge amount of chemicals and produces ferrous iron sludge. Using other advanced oxidation processes (AOP) like ultraviolet irradiation and electrochemical oxidation are not cost-effective. Advanced membrane filtration technology like reverse osmosis and ultrafiltration are also very expensive and suffer from rapid membrane deterioration. Therefore, a new approach to treat the indigo dye wastewater in a sustainable and cost-effective way is needed.

Wastewater containing indigo dye cannot be treated satisfactorily by the primary (for example, screening, sedimentation) and secondary (for example, aerobic or anaerobic digestion, coagulation, flocculation) treatment processes in conventional water treatment processes and many tertiary treatment processes are expensive and not feasible. For these reasons, adsorption is widely employed as a treatment process for indigo-containing wastewater. Activated carbon (AC) as an adsorbent is one of the effective methods to remove organic and inorganic pollutants from industrial wastewaters. However, adsorption is a separation process where pollutants are only transferred to adsorbents but not degraded to harmless substances. Also, an adsorbent has a limited adsorption capacity and will be saturated after a certain time of operation. Therefore, spent adsorbent will be disposed and replaced with a new one. Regeneration is another option to restore the adsorption capacity for the adsorbent. Popular regeneration methods include thermal treatment, solvent washing, electrochemical treatment and chemical treatment. However, they are either not cost-effective or not environmentally friendly due to secondary pollution.

Ozone is a powerful oxidizing agent ($E_0$=2.08 eV) and can react with several classes of compounds through direct (oxidizing dye by molecular ozone) or indirect reaction (oxidizing the dye with the assist of a catalyst in generating hydroxyl radicals). Ozonation can in-situ restore the adsorption capacity of spent adsorbents and can also degrade organic pollutants adsorbed. Therefore, it is of great interest to investigate a material which can adsorb indigo dye and whose adsorption capacity can be retained after an ozone regeneration process.

SUMMARY OF THE INVENTION

Indigo in indigo-containing wastewater could be adsorbed by a metal oxide modified adsorbent and regenerated by ozone-based technology in accordance with aspects of the present invention. Indigo dye is extensively used by the textile industry. As the indigo dye has a high molecular weight and low biodegradability, and is toxic for microorganisms used in a secondary treatment process, for example, aerobic or anaerobic digestion. Aspects of the invention provide an alternative tertiary treatment process different from conventional adsorption using a combined adsorption and regeneration treatment process as a solution of overcoming problems arising from use of previously know and practiced treatment processes. In the adsorption treatment process disclosed herein, a metal-oxide modified adsorbent has been modified with metal catalysts by impregnation-calcination procedures. The metal-doped alumina adsorbent could act as both an adsorbent and a catalyst. The indigo dye is adsorbed onto meso- and/or micropores of the adsorbents while the neighbor metal catalyst facilitates ozone generating hydroxyl radicals (OH*). This is a highly efficient method and system for degradation of indigo dye and regenerates the adsorbent for reuse. In an embodiment of the regeneration process, ozonated water produced by ozone and water is used to degrade the indigo and regenerate the adsorbent. At least 80% of the adsorption could be retained after 10 adsorption-regeneration cycles. While coupled with a micro-nano-bubbler device, the prolonged retention of ozone in an aqueous phase has resulted in better regeneration efficiency. The overall process provides a more cost-effective and environmentally friendly way for treating the indigo-containing wastewater. It is to be noted that the disclosed combined adsorption and regeneration process is also suitable for the treatment of other types of dye-containing wastewater.

According to an aspect of the present invention, a method of treating indigo-containing wastewater to remove indigo from the wastewater comprises the steps of: exposing the wastewater to an adsorbent capable of adsorbing the indigo for a sufficient period of time for the indigo to be adsorbed; and regenerating the indigo-saturated adsorbent of step 1 by exposing to ozone for a sufficient period of time for the decomposition of the indigo dye adsorbed.

According to another aspect of the invention, a system for treating indigo-containing wastewater, comprises a peristaltic pump which pumps out indigo-containing wastewater; an adsorption column filling with an adsorbent, to remove indigo dyes in wastewater; and outputs effluent; an ozone generator; a micro-nano bubbler; a flow controller; an ozone analyzer; and an ozone destructor for the removal of residual gaseous ozone from regeneration process; wherein the metal oxide modified adsorbent carrier is added to the indigo-containing wastewater in the reaction column, indigo in the wastewater is adsorbed on the metal oxide modified adsorbent, and the metal oxide modified adsorbent having indigo adsorbed thereon is treated and regenerated with the ozone micro-nano bubbler.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figures 1, 2:
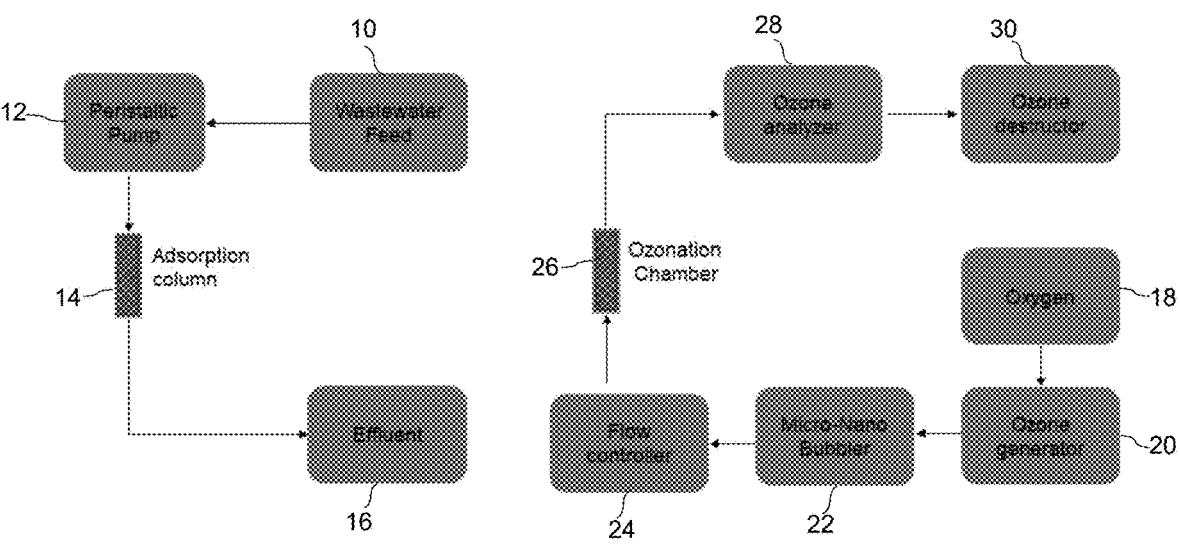
FIG. 1 is a schematic diagram of an adsorption and regeneration system that is used to treat indigo-containing wastewater.
FIG. 2 shows Brunauer-Emmett-Teller (BET) surface analysis results of alumina ($Al_2O_3$) and iron-doped alumina (Fe-alumina, from alumina impregnated in $0.1M$ $Fe(NO_3)_3$ solution).

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the invention relate to a treatment process for the indigo-containing wastewater by a combined adsorption and ozonation process. Indigo-containing wastewater is first treated by primary process (for example, screening and/or sedimentation) and secondary process (for example, aerobic or anaerobic digestion, coagulation, flocculation). The combined adsorption and ozonation treatment process provides a tertiary treatment process using a combined adsorption and regeneration treatment process as a solution. An integrative approach is provided in which combined process of adsorption and ozonation coupled with a micro-nano-bubbler are used for removing the indigo dye from textile wastewater and the adsorbent materials with regeneration properties have been developed. As a result, an adsorption capacity of adsorbent materials is restored. Coupled with the micro-nano-bubbler device, prolonging the retention of the ozone in the aqueous phase has resulted in better regeneration efficiency.

In the adsorption treatment process disclosed herein, a metal-oxide modified adsorbent is modified with metal catalysts by impregnation-calcination procedures. The metal supported adsorbent could act as both an adsorbent and a catalyst. The indigo dye is adsorbed onto micro- and/or mesopores of the adsorbent while a neighbor metal catalyst facilitates ozone to generate hydroxyl radicals. This is a highly efficient method and system for degradation of indigo dye and regenerates the adsorbent for reuse. In an embodiment of the regeneration process, ozonated water produced by dissolving ozone in water is used to degrade indigo in adsorbent and regenerate the adsorbent. The regeneration cycle could be retained at least 80% for 10 cycles. While coupled with a micro-nano-bubbler device, the prolonged retention of ozone in an aqueous phase has resulted in better regeneration efficiency. The overall process provides a more cost-effective and environmentally friendly way for treating the indigo-containing wastewater. It is to be noted that the disclosed combined adsorption and regeneration process is also suitable for the treatment of other types of dye wastewater.

Schematic diagram of adsorption and regeneration system.

Preparation of Fe-alumina.

Commercial alumina ($Al_2$ has been used for the development of the modified alumina. Alumina (size: 1.4-1.8 mm, by Sasol) modified with iron metal are prepared by impregnation-calcination method. Alumina is first soaked in $0.1M$ of iron (III) nitrate ($Fe(NO_3)_3$) solution for 18 hours under room temperature and pressure. The impregnated alumina is then filtered under room temperature and pressure, dried in oven at 100 to 105 deg. C. for 24 hours, and subsequently calcinated at 400 deg. C. for 4 hours.

FIG. 1 is a schematic illustration of an adsorption and regeneration system, which is numbered 02 and 04, respectively, according to an embodiment of the present invention. Adsorption system 02 includes one adsorption column 14 packed with adsorbent, which is Fe-Alumina. It also includes a wastewater feed 10 and a peristaltic pump 12 in flow communication with, adsorption column 14. In an adsorption treatment process 2, wastewater 10 is fed to a peristaltic pump 12. Dye-containing wastewater 10 is then fed to an adsorption column 14 which outputs effluent 16.

For adsorbent regeneration process 04, it includes an ozone generator 20, which generates ozone from an oxygen source 18, an ozonation chamber 26, an ozone analyser 28 and an ozone destructor 30. In a regeneration treatment process 04, oxygen 18 is provided to an ozone generator to generate ozone, which subsequently mixes with water at a micro-nano bubbler 22 where ozone stream is sheared and break into a number of micro- and nano-sized bubbles through turbulence induced by flowing water. The flow to the ozonation chamber 26, which is in fact the same adsorption column 14, is regulated by a flow controller 24. Residual ozone from the ozonation chamber 26 is directed to an ozone analyser 28 and further to an ozone destructor 30. Filling with metal catalyst, the ozone destructor 30 converts ozone gas to oxygen before releasing in the atmosphere. The regeneration efficiency (RE %) is defined as ratio of the amount of dye (mg) removed per gram of regenerated adsorbent after one adsorption-regeneration cycle ($q_{reg}$), to the amount of dye (mg) removed per gram of fresh adsorbent ($q_{fresh}$). It is defined as below:

$$RE\% = (q_{reg}/q_{fresh}) \times 100$$

FIG. 2 shows Brunauer-Emmett-Teller (BET) surface area analysis results of Alumina ($Al_2O_3$). The alumina after impregnated with 0.1M iron (III) nitrate (Fe(NO₃)₃) aqueous solution and calcination is known as Fe-alumina. The decrease in pore volume after impregnation-calcination suggests some pores over Fe-alumina surface area occupied by iron oxides.

Figure 3A:
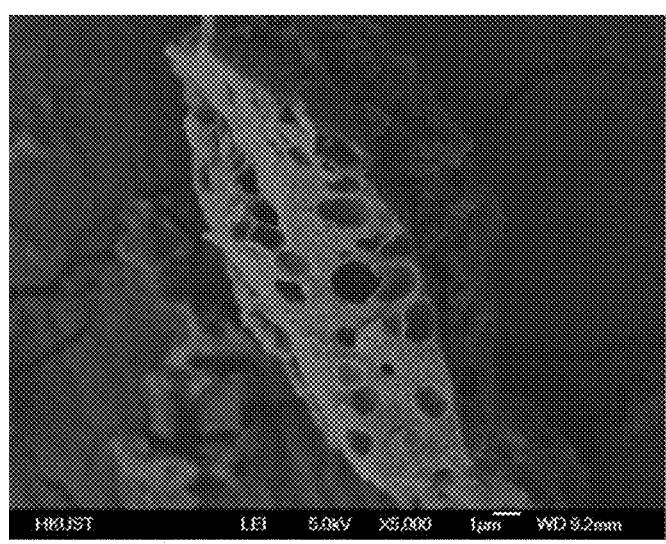
FIG. 3A is an SEM (scanning electron microscope) image of alumina and FIG. 3B is an SEM image of Fe-alumina.
Figure 3B:
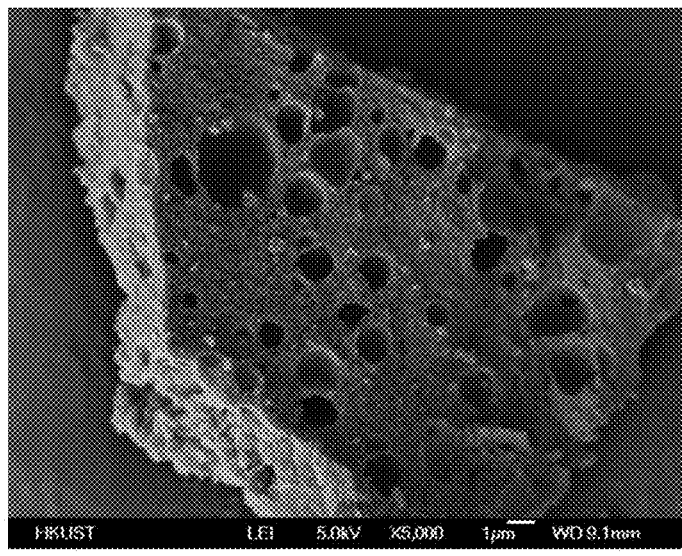

FIGS. 3A and 3B are SEM images of alumina (Al₂O₃) and iron-doped alumina (Fe-alumina). In FIG. 3B, the light-coloured, small-size deposits over Fe-alumina surface and at the edge of pore openings indicate the presence of iron oxides.

Figure 4:
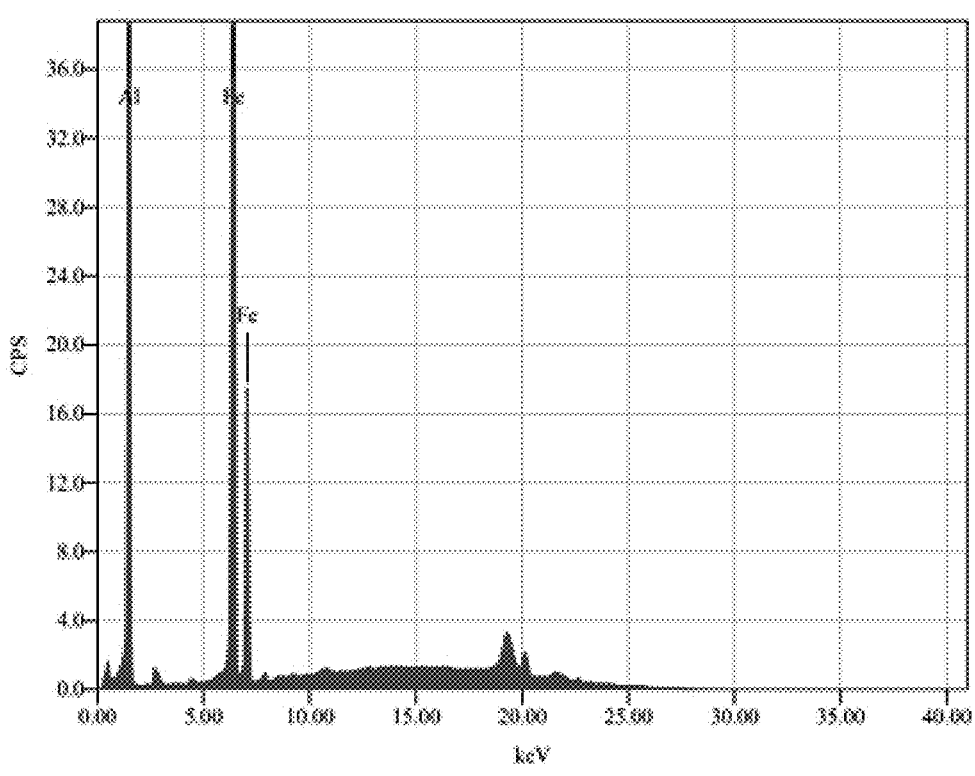
FIG. 4 is an XRF spectrum for 0.1M Fe-alumina.
Figures 5A, 5B, 5C, 5D:
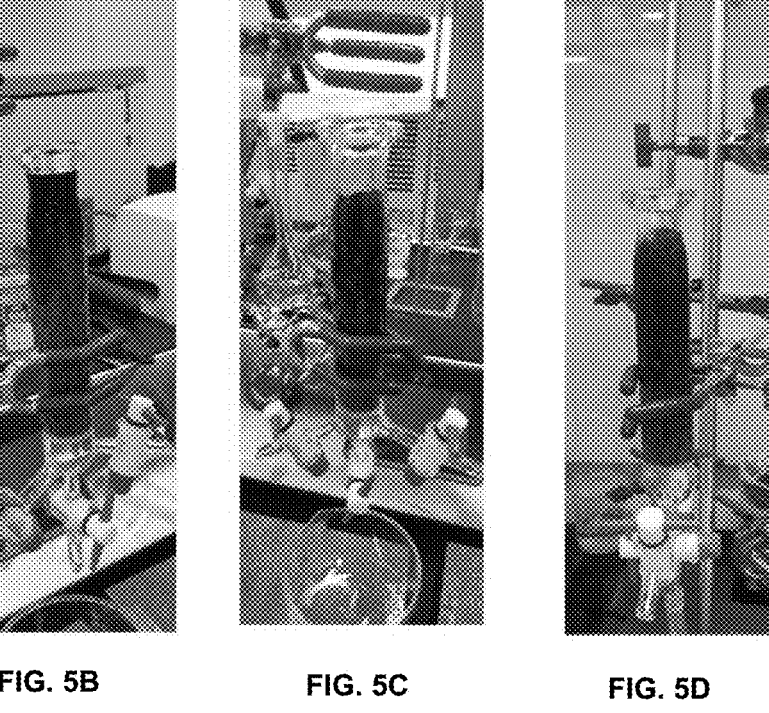
FIGS. 5A to 5D show a column adsorption process with respect to time, from left to right.

FIG. 4 is an XRF spectrum for 0.1M Fe-alumina. Major emission peaks in the range of 5 to 10 keV indicate the presence of iron metal.

FIGS. 5A to 5D show a column adsorption process with respect to time, from left to right. (5A) Dye effluent enters the column in the down-flow manner. Dye is adsorbed effectively by the upper few layers of the fresh Fe-alumina. (5B) When more dye is adsorbed, some are readily escaped in the lower strata of the bed. The upper layer of Fe-alumina is gradually saturated. (5C) Fe-alumina continues to adsorb dye. The lower layer of Fe-alumina starts to turn blue. (5D) The adsorbent is close to completely saturated.

Figure 6:
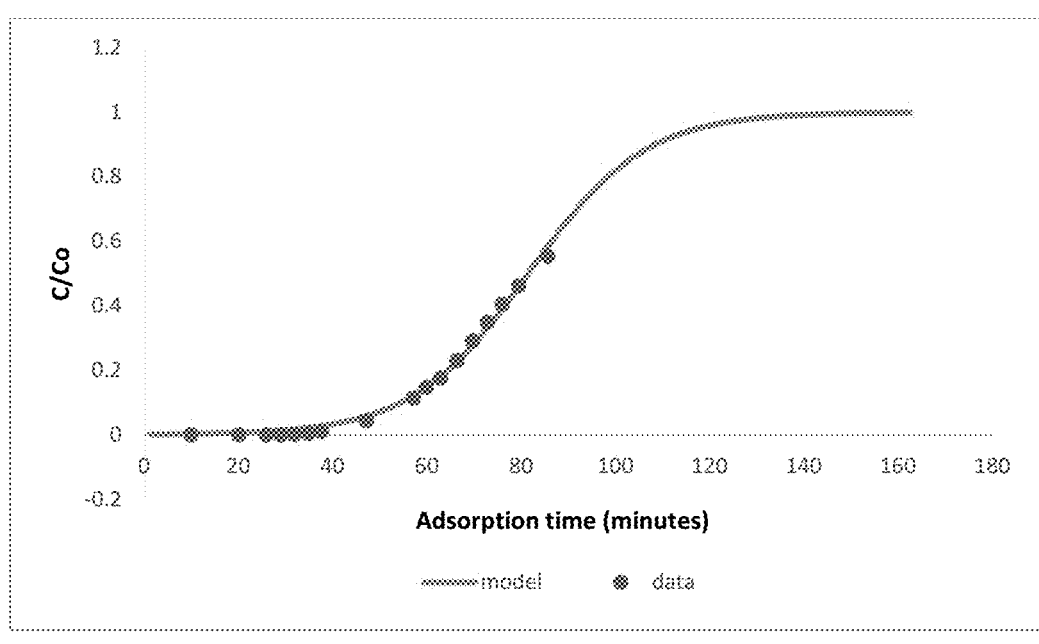
FIG. 6 shows a breakthrough curve of Fe-alumina with a 2000 ppm indigo solution.

FIG. 6 shows a breakthrough curve of Fe-alumina with a 2000 ppm indigo solution. Breakthrough curve is a plot of the dye concentration in the column effluent as a function of time. At adsorption time (t) is zero, indigo-containing effluent enters the column at the top at concentration C₀. The effluent dye concentration (C) increases with time, and eventually attains equilibrium (C/C₀ closes to 1) when most adsorbent is saturated with dye. The breakthrough time, which is defined as C/C₀ over 0.05, is about 36 minutes. Experimental data is fitted with Thomas model which the expression for an adsorption column is shown as below (Selambakkannu S. et al., SN Applied Sciences (2019) 1:175):

$$\ln\left(\frac{C_o}{C}-1\right)=\frac{k_{Th}q_o w}{Q}-k_{Th}C_o t$$

where C₀ is the influent dye concentration (mg/L), C is the effluent dye concentration (mg/L), K_{Th} represents Thomas model constant (mL/(min. mg)), q_o is the equilibrium adsorption amount of dye, indigo on Fe-alumina (mg/g), w is the mass of the Fe-alumina (g) and Q is the flow rate (mL/min).

Figure 7:
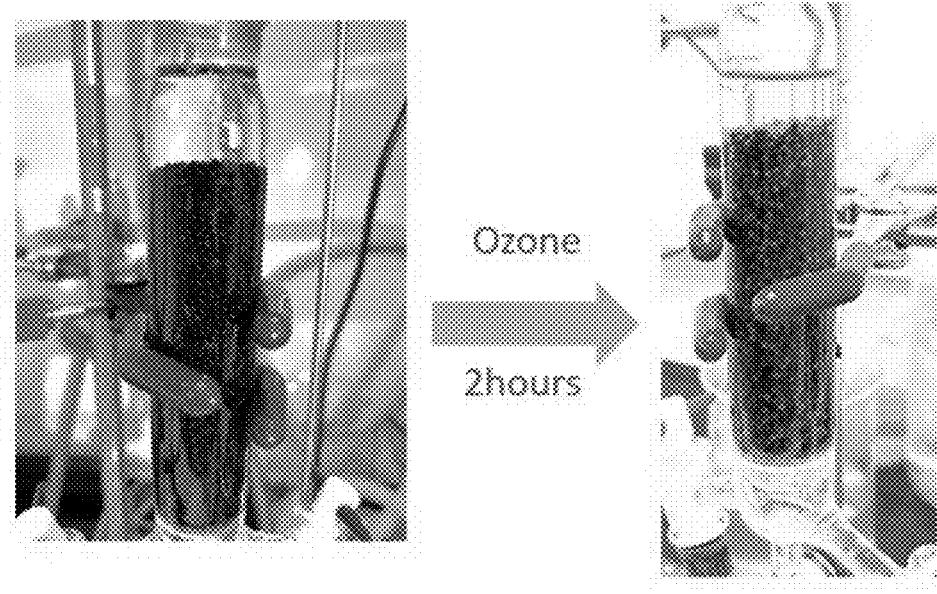
FIG. 7 shows an ozone regeneration process of indigo dye-saturated Fe-alumina in a glass adsorption column.

FIGS. 7A and 7B show an ozone regeneration process of dye-saturated Fe-alumina packed in a glass adsorption column, from left to right. FIG. 7A) is the dye-saturated Fe-alumina before ozone regeneration. FIG. 7B) shows that, after exposed to ozonated water for 2 hours, dye adsorbed onto Fe-alumina are decomposed by ozone and hydroxyl radicals from ozone. The Fe-alumina shows brown colour similar to the colour before adsorption, indicating the recovery of adsorption capacity.

Figure 8:
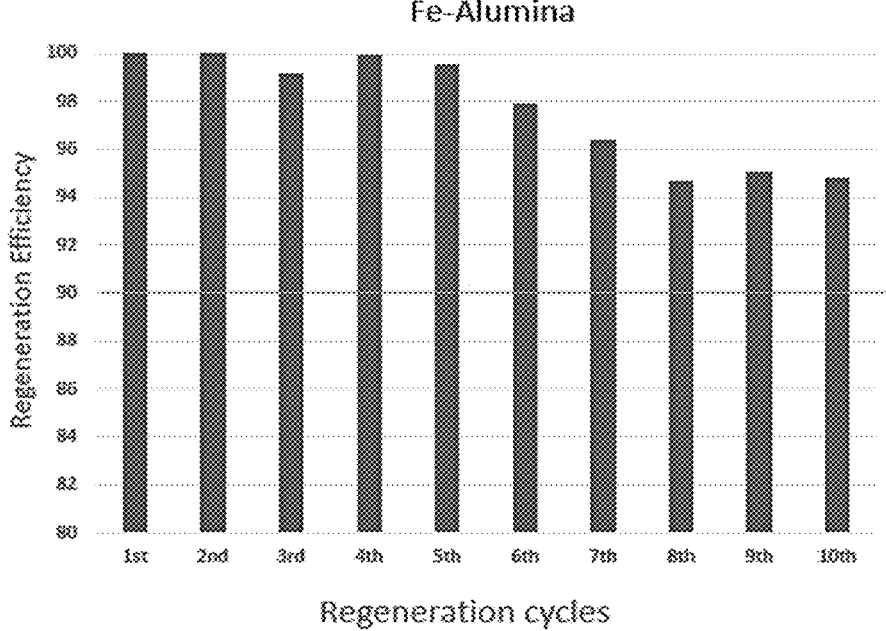
FIG. 8 is a chart of regeneration efficiency of Fe-alumina.

FIG. 8 is a chart of regeneration efficiency of Fe-alumina. After 10 adsorption and regeneration cycles, the regeneration efficiency is retained at over 90%. For each regeneration, it takes about 40 minutes to regenerate about 3 grams of dye-saturated Fe-alumina.

Figure 9:
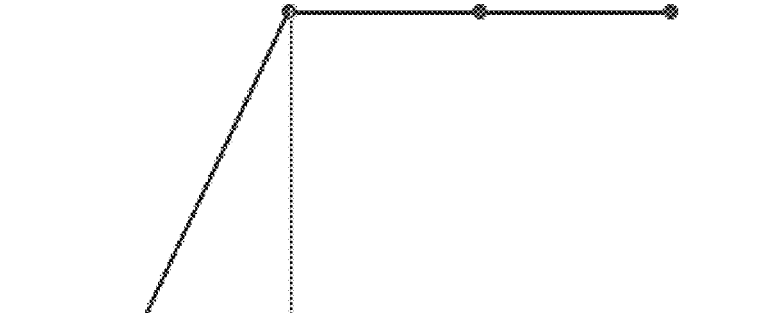
FIG. 9 is a chart of regeneration time of Fe-alumina.

FIG. 9 is a chart showing regeneration time of Fe-alumina. The regeneration efficiency is found to increase with time. At the ozone dosage of about 6 to 7 mg/min, the regeneration efficiency attains about 60% after 20 minutes of continuous exposure of ozonated water, and further increases to over 90% after 40 minutes.

Many of the commonly used adsorbent for dye removal from wastewater, for example, activated carbon, are difficult to recover and recycle, and suffer from high activation and regeneration costs. The disposal of spent adsorbent is rather costly but is also hazardous to the environment.

The adsorbent in the present invention, which is, Fe-alumina, offers a unique advantage because of its effectiveness on removing organic compounds (e.g., dyes) from wastewater and also the ease of reusability. By ozonation, dyes adsorbed are decomposed either by direct oxidation in the presence of molecular ozone, or by indirect oxidation with hydroxyl radicals (OH*) that are generated from the decomposition of ozone which is catalyzed by Fe²⁺ on the surface of Fe-alumina. After ozone regeneration, the adsorption capacity of Fe-alumina is recovered as dyes adsorbed are already decomposed. Compared with conventional regeneration techniques, such as thermal and chemical (e.g., solvent washing) regeneration, one advantage of the present invention is that on-site regeneration of spent adsorbents and destruction of adsorbed organic material (e.g., dye) is provided. Another advantage of the present invention is that the adsorbed organic material (e.g., dye) is destroyed or decomposed to non-toxic forms such as carbon dioxide (CO₂) and water (H₂O). As no residue (e.g., sludge containing metal ions) is generated at the end of wastewater process, the present invention will not incur secondary pollution due to discharge of sludge or used solvent. Still another advantage of the present invention is that the adsorbents can be used and reused for multiple adsorption/regeneration cycles. The examples which follow are merely illustrative, and should not be construed to be any sort of limitation on the Scope of the claimed invention.

Example 1 In-Situ Regeneration of Spent Adsorbent Using Ozonation

In this example, spent adsorbent was prepared. More specifically, in this example, approximately 25 to 30 grams of Fe-alumina was loaded to a glass column having a diameter pf 2 cm and a height of 16 cm. The bed height was approximately 10 cm. Indigo dye solution at a concentration of about 90 to 110 mg/L, was directed to the column in downflow manner, by a peristatic pump, at a flow rate of about 3 to 5 mL/min for approximately 30 to 40 minutes at a room temperature (approximately 21 to 26° C.). After loaded with indigo until exhausted, the Fe-alumina was regenerated in the same column where ozonated water (gaseous ozone concentration: approximately 10 to 20 g/m³) was directed through the column in an upflow manner at conditions at a flow rate of about 200 to about 400 mL/min for approximately 2 hours.

Example 2 Reuse of Regenerated Fe-Alumina

The adsorbent (e.g., Fe-alumina) would have to be reused several times in order to enhance the economic benefits of the above-described processes. A set of tests was conducted in which the same Fe-alumina was used for about 10 cycles. A full cycle includes an adsorption step and a regeneration step. Each test was completed in the same column.

FIG. 8 plots the amount of regeneration efficiency of Fe-alumina through ten sequential, adsorption-regeneration cycles. Ozonation was effective at decomposing the adsorbates from the spent Fe-alumina, whereas the regeneration efficiency was restored to over 92% of its initial capacity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of treating indigo-containing wastewater to remove indigo from said wastewater, comprising:

providing a column filled with an adsorbent capable of adsorbing the indigo;

pumping the wastewater comprising the indigo into the column, thereby exposing the wastewater to the adsorbent for a sufficient period of time for the indigo to be adsorbed and generating indigo-saturated adsorbent and a column effluent;

destroying residual gaseous ozone from the effluent:

stopping the pumping of the wastewater into the column; and regenerating the indigo-saturated adsorbent by:

(a) generating ozone in water with an ozone generator, (b) generating micro-nano-bubbles (MNBs) with a micro-nanobubbler in the water, (c) mixing the ozone and the MNBs in the water, and (d) directing the ozone mixed with the MNBs into the column, thereby decomposing the indigo;

wherein the adsorbent is $Fe(NO_3)_3$ created by an impregnation-calcination procedure with $Al_2O_3$, and wherein no sludge comprising metal ions is generated upon completion of the method.

2. The method for according to claim 1, wherein the adsorbent has an average particle size of 1 mm to 10 mm, and wherein the adsorbent has a micro-mesoporous structure with an adsorption capacity average of 30 mg/g to 100 mg/g.

3. The method according to claim 1, wherein the adsorbent retains at least 80% indigo adsorption capacity after 10 adsorption and regeneration cycles.

4. The method according to claim 1, wherein the adsorbent retains at least 90% indigo adsorption capacity after 10 adsorption and regeneration cycles.

5. The method according to claim 1, wherein the ozone generated has a concentration of 10 $g/m^3$ to 20 $g/m^3$ in the water.

* * * * *